United States Patent [19]
Michael

[11] Patent Number: 5,467,072
[45] Date of Patent: Nov. 14, 1995

[54] PHASED ARRAY BASED RADAR SYSTEM FOR VEHICULAR COLLISION AVOIDANCE

[75] Inventor: Joseph Michael, Beverly Hills, Calif.

[73] Assignee: Piccard Enterprises, Inc., Beverly Hills, Calif.

[21] Appl. No.: 212,043

[22] Filed: Mar. 11, 1994

[51] Int. Cl.$^6$ ....................................................... G08G 1/00
[52] U.S. Cl. ........................... 340/436; 340/901; 340/903; 367/909; 342/61; 342/70
[58] Field of Search ...................................... 340/901, 903, 340/904, 435, 436, 466; 367/909; 342/61, 70, 71, 72

[56] References Cited

U.S. PATENT DOCUMENTS

| | | | |
|---|---|---|---|
| 3,748,642 | 7/1973 | Radin et al. | 340/466 |
| 4,864,298 | 9/1989 | Dombrowski . | |
| 4,937,796 | 6/1990 | Tendler . | |
| 4,974,215 | 11/1990 | Bolz et al. . | |
| 5,026,153 | 6/1991 | Suzuki et al. . | |
| 5,039,217 | 8/1991 | Maekawa et al. . | |
| 5,087,918 | 2/1992 | May et al. | 340/435 X |
| 5,268,692 | 12/1993 | Grosch et al. | 342/70 |

OTHER PUBLICATIONS

"Car Obstacle Avoidance Radar at 94 GHz" by Mallinson et al., Published 1989 in Proceedings of the Institute of Mechanical Engineers (London).

"Obstacle Detection Radar for Cars" by A. G. Stove, Published 1991 by Institute of Electrical Engineers (London).

*Primary Examiner*—Brent A. Swarthout
*Assistant Examiner*—Edward Lefkowitz
*Attorney, Agent, or Firm*—Poms, Smith, Lande & Rose

[57] ABSTRACT

A phased array based radar and vehicular safety warning system for collision avoidance, including a phased array based radar, a controlling processor, and a warning system that also provides a warning to the driver of the equipped vehicle as well as drivers of other, non-equipped automobiles involved in an unsafe driving condition. The phased array radar includes a flexible antenna array that may be mounted conformally on existing automobiles without detracting from their design curvature. In one embodiment a pair of phased array radar antenna may be oriented towards opposing sides of an equipped automobile to provide warning surveillance of vehicles laterally approaching the equipped auto from the sides. In another embodiment a phased array radar antenna is oriented to the rear of the equipped automobile to provide warning surveillance of vehicles following the equipped auto too closely, and for warning of unsafe lane changes. In still another alternative embodiment a pair of phased array radar antenna having 180° fields of view may be installed in a pod mounted on the roof of the equipped automobile to provide 360° warning surveillance coverage.

32 Claims, 5 Drawing Sheets

PHASED ARRAY BASED RADAR SYSTEM FOR VEHICULAR COLLISION AVOIDANCE

FIELD OF THE INVENTION

The present invention relates to vehicular safety and, more particularly, to a system for generating a warning when unsafe driving conditions are encountered.

BACKGROUND OF THE INVENTION

For years attempts have been made to develop various types of vehicular safety systems to warn drivers of various imminent or existing unsafe driving conditions of the sort typically resulting from the drivers operation of their own vehicle. Such efforts have usually been directed to various types of safety systems that either warn a driver of obstacles directly in the path of the car or provide a warning when a vehicle equipped with the safety device is following to closely behind another automobile. Efforts have also been made to incorporate examples of the latter safety system into conventional vehicular speed control devices of an automobile (i.e. cruise control). Still another type of safety system has been proposed that warns drivers of another automobile following too closely behind a vehicle equipped with the safety system. Vehicular safety devices have also been developed in connection with collision avoidance when a vehicle is backing up such as, for example, when a commercial freight vehicle is backing up to a loading dock.

U.S. Pat. No. 5,206,153 to Suzuki, et al. and U.S. Pat. No. 5,039,271 to Maekawa, et al., provide examples of vehicular safety systems intended to warn a driver when following another automobile to closely. U.S. Pat. No. 5,937,746 to Tendlet and U.S. Pat. No. 4,864,298 to Dombrowski in turn provide examples of safety systems for warning a driver of eminent obstacle collision when a vehicle is backing up. An example of a system for providing distance information to a commercial truck backing up to a loading dock is shown in U.S. Pat. No. 4,974,251 to Bolz, et al. A safety system for warning drivers of other automobiles following to closely behind a vehicle equipped with the safety system is disclosed in U.S. Pat. No. 5,162,794 to Seth.

Regrettably the various types of vehicular safety systems discussed above almost invariably suffer from a number of impractical and expensive deficiencies. Both forward and rearwardly directed sensing system typically suffer from an unacceptably high number of false alarms. To date, none of these proposed systems have proved sufficiently practical to achieve widespread implementation. Thus, there still exists a need for a suitable vehicular collision avoidance system that can avoid false alarms, and which is susceptible to practical and economic implementation. The present invention fulfills this longfelt need.

SUMMARY OF THE INVENTION

Broadly, and in general terms, the present invention provides a vehicular collision avoidance system based on a phased array radar that is capable of tracking obstacles and other automobiles and determining an unsafe condition with a substantially reduced likelihood of false warnings by predicting the trajectory of approaching obstacles and automobiles. One novel aspect of the present invention concerns the use of a phased array antenna based radar system having a rapid scanning ability and comparatively high resolution with little or no effect on the shape or appearance of an equipped vehicle. Another novel aspect of the present invention concerns the use of a phased array radar to detect unsafe conditions resulting from automobiles approaching from the side of the equipped vehicle. Yet another aspect of the present invention concerns a warning apparatus for providing a warning to the drivers of other vehicles when an unsafe driving condition is determined or predicted. This feature is believed to substantially reduce the likelihood of an accident resulting from an unsafe driving condition since both the driver of the equipped automobile and the driver of any non-equipped vehicle involved in the unsafe condition may be notified of the need to take corrective action.

In one embodiment of the present invention a conformal phased array antenna system is employed having five full-dipole antennas spaced one-half wave length apart to provide a scanning beam forming a 10 degree arc with a 120 degree field of view. The entire phased array antenna system may be formed in a flexible strip that is capable of conforming to the curvature of a pre-existing vehicle shape. Monolithic millimeterwave integrated circuits may be employed to provide suitable signals to the phased array antenna system, allowing for use of a distributed and relatively lower power system for energizing the antenna array. The vehicular safety system of the present invention further includes an oscillator which may provide pulsed or continuous wave signals and a selectable phase delay for providing the output to any one of a plurality of transmitter amplifiers associated with each antenna element. The phased array antenna elements are further coupled to a receiver module which provides amplified return signals from the antenna elements to a coherent detector. In one embodiment another selectable phase delay is included between the receiver module and the coherent detector. Interconnections between the oscillator and transmit modules, as well as the interconnections after the receiver module, may further be implemented in optical fibers to enhance signal to noise ratios and reduce the weight of the entire safety system.

The microprocessor controller for the phased array radar operates to control both the function of the radar and analyze return signals from the radiated antenna beam. In operation, the radar may be operated in either a pulsed mode or frequency modulated continuous wave (FMCW) mode to provide both relative positional and velocity measurements for targets sensed by the phased array radar. In various embodiments of the invention these targets may include obstacles in the path of the equipped vehicle, automobiles approaching the equipped vehicle from the side, or automobiles following too closely behind the equipped vehicle. The rapid tracking and scanning capability of the phased array antenna radar even permits acquisition of a radar signal when the equipped vehicle is moving on a curve, and provides predictions of potential collisions from targets having curved trajectories. A separate measurement of the ground speed of the equipped vehicle may further be provided to accommodate determination of an absolute velocity for approaching automobiles or other targets.

A further novel aspect of the present invention concerns calculation of an unsafe condition by repetitive measurement of the range, velocity and acceleration of an approaching radar target, such as another automobile, so as to track the path or trajectory of the target and predict a subsequent path for the target. Smoothing and predicting equations are employed in one embodiment of the invention to predict from an established target path an extrapolated and probable nonlinear trajectory. A resulting predicted trajectory for a target thus includes velocity and acceleration vectors that are both time dependent. False alarms resulting from extrapolations of only a linear path can therefore be avoided. If a time, velocity, and acceleration dependent distance vector for the target is predicted to come within a predetermined minimum, an alarm warning may be provided to the driver of the equipped vehicle. A further warning device provides a signal to the driver of the following automobile that they are approaching too closely.

The present invention will be better understood by review of the following detailed description and accompanying drawings, wherein like numbers designate like elements. It should be expressly understood, however, that the figures are for purposes of explanation and illustration only and are not intended as any limit of the present invention.

DETAILED DESCRIPTION OF THE PREFERRED EMBODIMENTS

Figure 1:
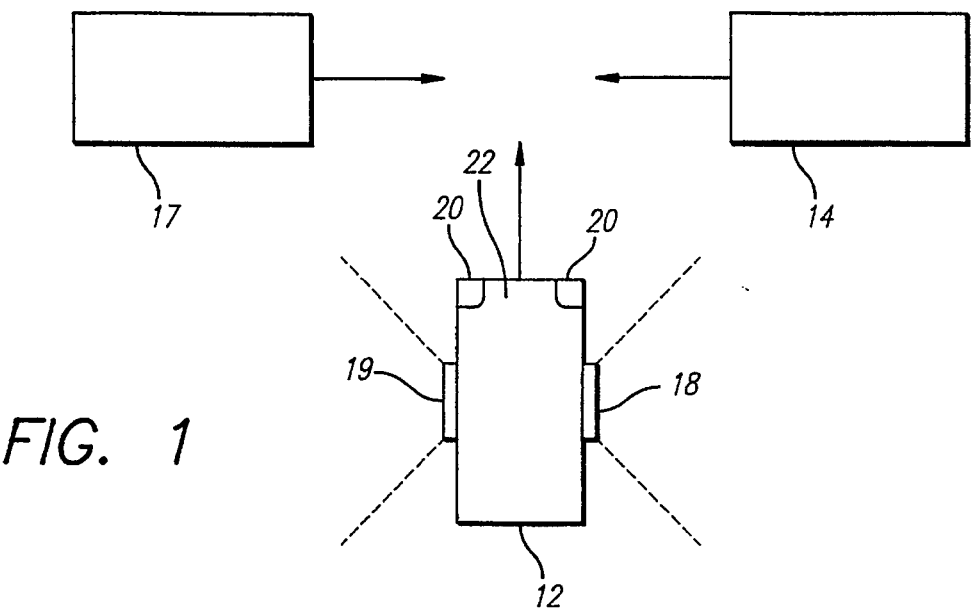
FIG. 1 is a top down view of an automobile equipped with one embodiment of the present invention relative to other automobiles.

Referring to the figures, and more particularly FIG. 1, there is shown an illustrative example of one embodiment of the present invention suitable for use in monitoring automobiles approaching from the side of a vehicle equipped with the invention. One of many factors contributing to a substantial number of automotive collisions results from a common failure of a driver to look either or both ways to the side of his or her automobile when proceeding through an intersection. Even when the driver has the right of way, a significant number of automotive accidents could be avoided if the driver were to look to their lateral sides before proceeding into an intersection. One embodiment of the present invention provides a phased array based radar system configured to monitor obstacles and approaching automobiles relative to the lateral sides of an equipped vehicle 12. In this embodiment the vehicle 12 is provided with a pair of phased array radar systems 18 and 19 providing coverage to opposing sides of the vehicle 12. This phased array based radar system may be used to determine when other automobiles, such as automobiles 14 and 17, are approaching the equipped vehicle 12 from the sides in an unsafe condition. If an unsafe driving condition is determined or predicted, suitable warning is provided by the safety system to not only the driver of the equipped vehicle 12, but also to the driver of whichever of automobiles 14 and 17 may be involved in the unsafe driving condition.

The use of a phased antenna array based radar system renders the concept of side looking collision avoidance practical. Since the phased array antenna does not require moving parts, a rapid electronic scanning of the effective field of view of the antenna can be achieved at a repetition rate sufficiently high to make track-while-scan monitoring practicable. The phased array radar of the present invention, discussed more fully below, may operate at a repetition rate on the order of 100th of a second per sweep across the field of the view of the array. This scan rate cannot realistically or reliably be achieved with a mechanically aimed radar device. Use of a phased array radar for a side looking vehicular safety system further minimizes the impact of the radar system on the appearance of the vehicle. A rugged phased array antenna structure may be formed on a flexible strip that may be conformed to the curvature or configuration of existing automobiles. The phased array antenna system of the present invention also has a higher resolution than comparable conventional antenna systems employing a mechanically aimed antenna, thus affording satisfactory target resolution from a smaller antenna array, and further reducing the impact of the present invention on the appearance of the automotive vehicle.

If a probable collision or other unsafe driving condition is determined to be present or predicted to be imminent, a warning is provided to the driver of the equipped vehicle and to the driver of any other vehicle involved in the unsafe condition in sufficient time to alter the path of their respective cars and avoid potential collision. A variety of suitable warning devices may advantageously be employed to communicate an unsafe driving condition to the driver of equipped vehicle 12. A suitable warning system may include an audio alarm, visual alarm, or a combination of the two. In one embodiment this warning system may include a pair of audio alarms disposed on a opposing sides of the driving compartment so as to provide an audible cue as to which side of the equipped vehicle 12 another vehicle is approaching in an unsafe manner. Referring to FIG. 1 these audio alarms are schematically illustrated, at 21 and 23, on opposing sides of the equipped vehicle 12.

A suitable device for further warning drivers of other vehicles of an unsafe driving condition is also included in the present invention, thus providing a warning to the drivers of both vehicles that an unsafe condition exists. Both drivers may thus be informed by the warning system of an immediate need for taking appropriate measures, such as slowing down or evasive maneuvering. For example, the headlights 20 of the equipped vehicle 12 may be caused to flash and the horn 22 of the vehicle 12 may be activated to provide both visual and audible warning to the drivers of the approaching vehicles 14 and 17. The immediacy of collision may be indicated to the driver by varying the frequency of a visible flashing device or the tone or volume of an audible warning device, based on the relative speed and distance between the equipped vehicle and an approaching automobile, or the relative immediacy of an unsafe condition.

Figure 2:
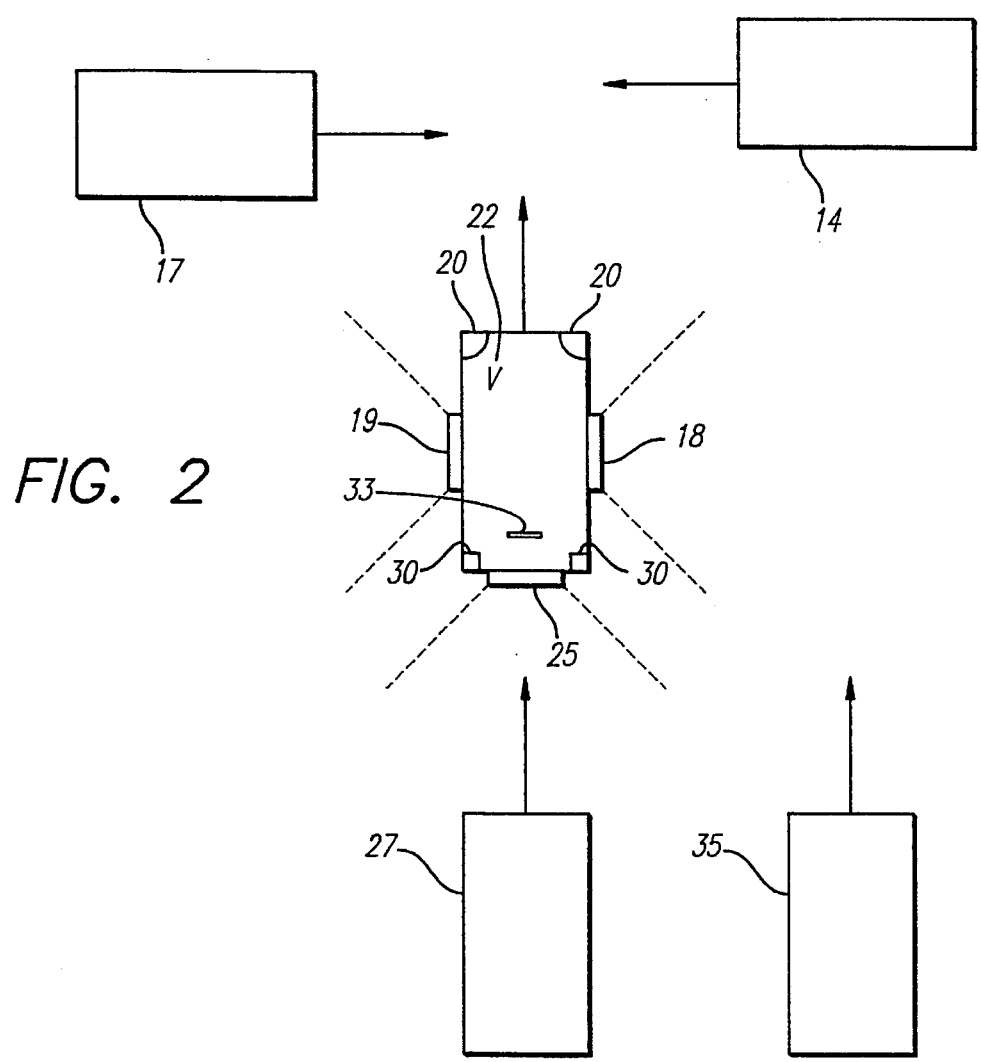
FIG. 2 is a top down view of an automobile equipped with an alternative embodiment of the present invention relative to other automobiles.

In an alternative embodiment of the present invention, illustrated in FIG. 2, a third phased array radar 25 may be mounted on the rearward portion of an equipped vehicle 12 so as to detect the presence of automobiles following behind the vehicle 12, such as automobile 27, and determine if the following automobile 27 is too closely for the absolute or actual ground speed of the respective vehicles. A warning is also provided to the driver of the following automobile 27 indicating that they are too close behind the equipped vehicle 12. The warning provided to the driver of the following automobile 27 may also be visible, audible or both and may include activation of any rear lamp 30 or the stop lamp high mount 33 of the equipped vehicle 12.

In this embodiment the equipped vehicle 12 may further be configured to provide a warning to the driver of the vehicle 12 if an anticipated lane change is unsafe. The rearwardly directed phased array antenna may be used to detect both a vehicle 27 following in the same lane as the equipped automobile 12 and a vehicle 35 following in an adjacent lane. The vehicular safety system of the present invention may further determine whether there will be sufficient spacing between the equipped vehicle 12 and the adjacent automobile 35 after an anticipated lane change. If there is insufficient spacing, a warning may be provided to the driver of the equipped vehicle 10 that the anticipated lane change is unsafe. This aspect of the invention thus provides an additional assistance to the driver of the equipped vehicle 12 in driving defensively, and reduces the likelihood of the equipped vehicle 12 cutting off an adjacent following automobile 35 in a blind spot of the driver in the equipped vehicle 12.

Figure 3:
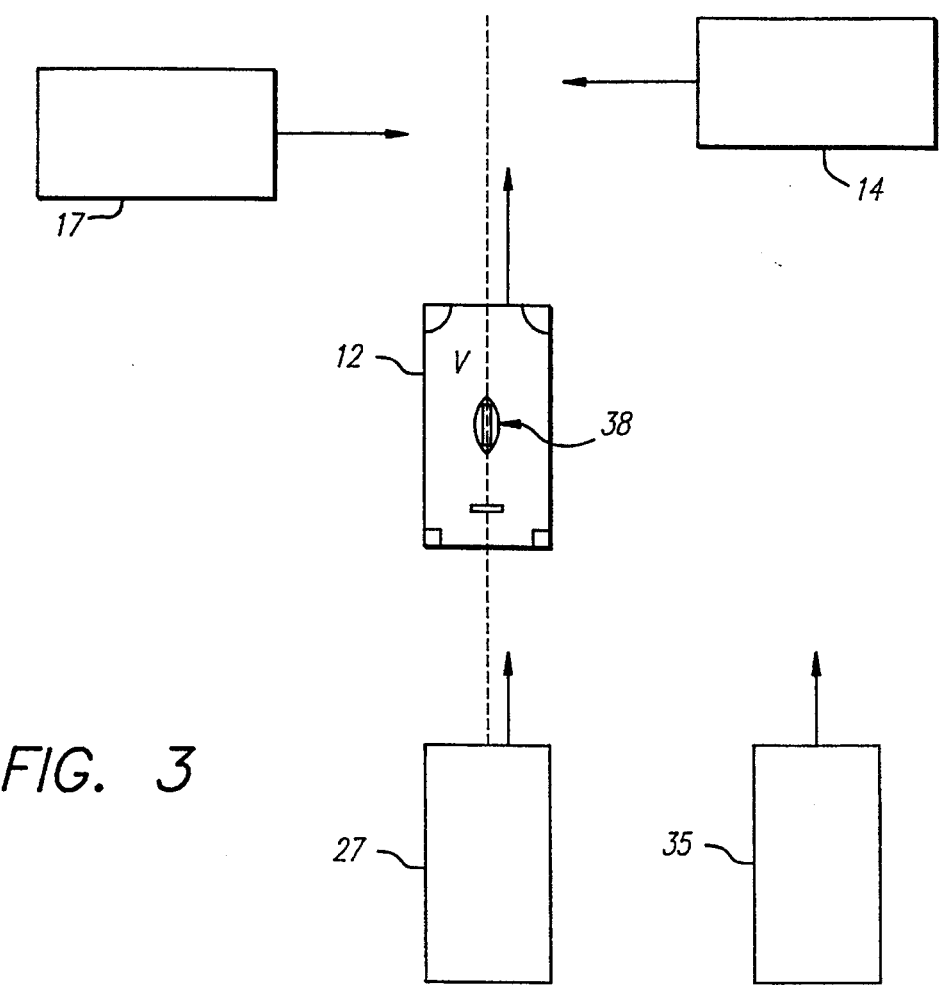
FIG. 3 is a top down view of an automobile equipped with yet another embodiment of the present invention relative to other automobiles.

Referring to FIG. 3 an alternative embodiment of the phased array antenna system is shown in which a pod 38 is mounted on the roof of an equipped vehicle 12. A pair of phased array antenna structures may be mounted within the pod 38 in opposing relationship to respectively provide 180 degree fields of view which, in combination, form a phased array based radar warning system having a 360 degree field of view about the equipped vehicle 12.

Figure 4:
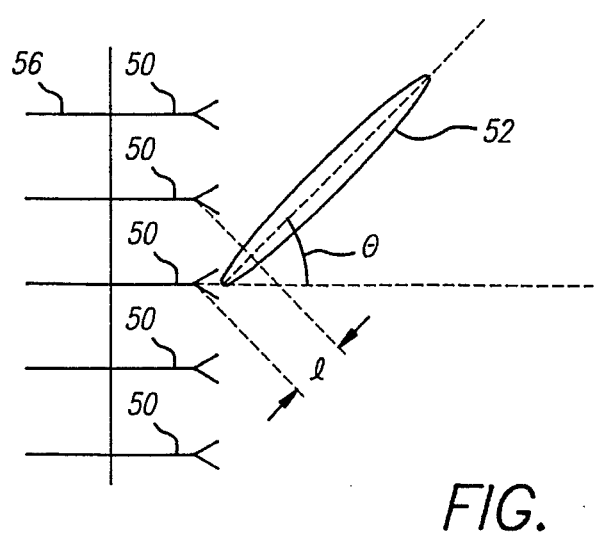
FIG. 4 is a schematic illustration of a phased array radar antenna.

Referring to FIG. 4 there is shown the manner in which the individual and fixed antenna elements 50 may be used to both steer the direction of a transmitted radar beam 50 and to receive a reflected radar beam (not shown). Each antenna element 50 receives a transmission input signal from an electrical input/output line 56, and converts this input signal into an electromagnetic field having a radiation pattern in accordance with known antenna principles. If a relative phase delay is introduced into the signals directed to the individual antenna elements 50, the resulting propagation pattern provides a narrow radar beam that can be directed at a steerable angle $\theta$. In one preferred embodiment five dipole antenna elements 50 are employed. These dipole antenna elements 50 are spaced apart a distance approximately one-half the wavelength of the intended radar beam wavelength, so as to provide a steerable beam having about ten degrees resolution across a 120 degree field of view. The time delay of the microwave signal for an nth antenna element is provided in accordance with the equation $t_n = nD/c \sin(\theta)$, where c is the velocity of light and D is the distance between the individual antenna elements of the steerable array. A steerable, narrow angle beam may thus be generated at an angle $\theta$ that may be changed so as to sweep across the effective field of view of the array by varying the phase delay of the radar signals supplied to each of the individual antenna elements. The entire antenna array may be fabricated in a single microstrip configuration which can be printed upon a conformal flexible strip. This flexible strip may be conformally attached to an appropriate portion of the equipped vehicle without detracting from the shape of the vehicle, while still providing a wide effective field of view for the phased array antennas.

Figure 5:
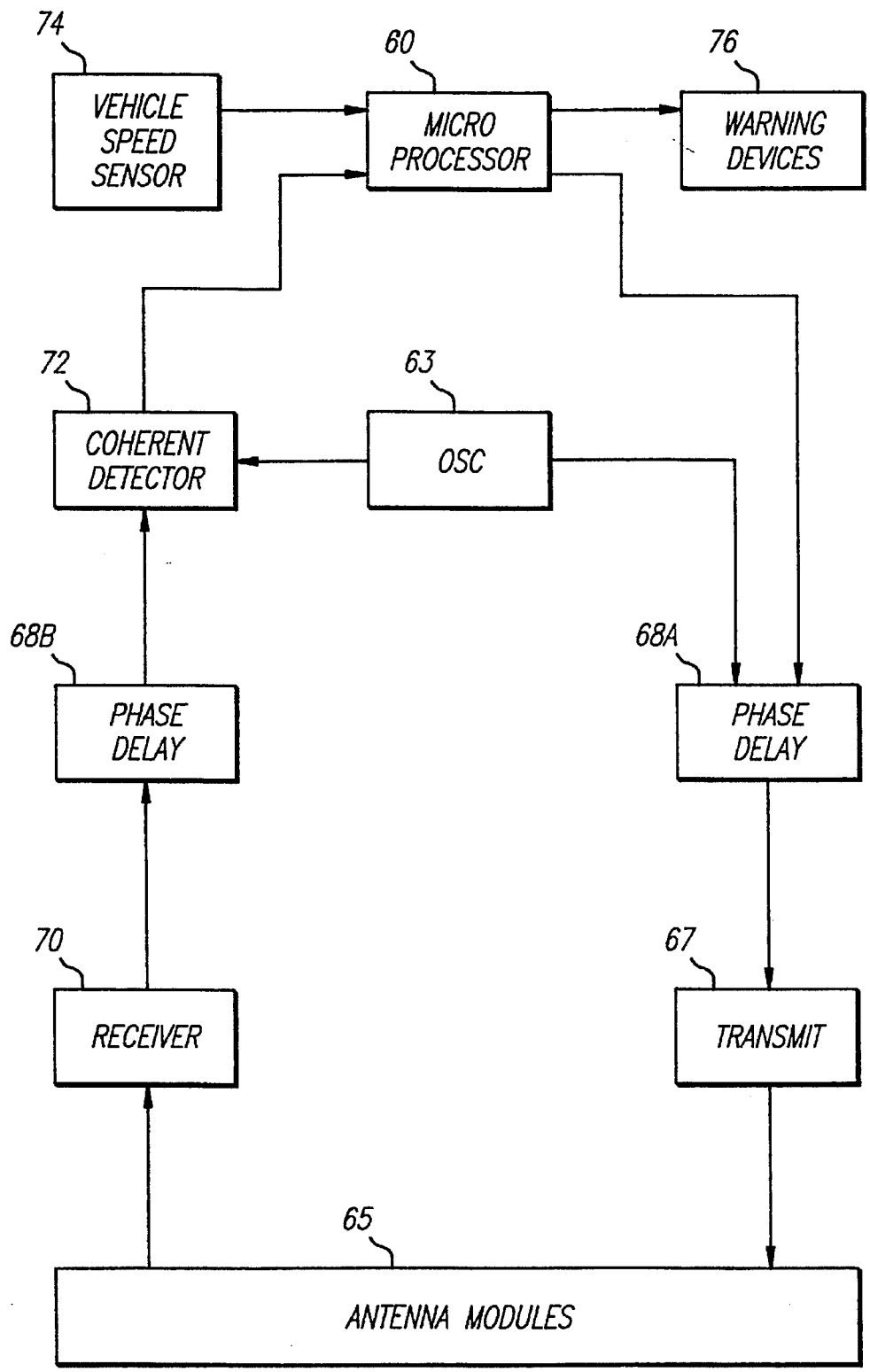
FIG. 5 is a functional block diagram of one embodiment of the present invention.

Referring to FIG. 5 there is shown an exemplary arrangement of the radar circuitry controlling the operation of the phased array antenna. As shown a microprocessor 60 provides control signals to an oscillator 63 for generating a signal of suitable frequency that, when amplified, will result in the generation of a radar beam from the antenna elements illustrated in FIG. 4. The radar frequency signal from the oscillator 63 is provided to a phase delay 68A which in turn receives phase shifting instructions from the microprocessor 60. The output from the phase delay 68A is supplied to a transmit module 67. This transmit module 67 includes a distributed set of low power amplifiers for boosting the radar frequency signal from the oscillator 63 (with the addition of an appropriate delay in the signal phase from the phase delay 68A) to the antenna module 65. The antenna module 65 is further coupled to a receiver 70 which amplifies the radar signals reflected back to the antenna module 65 from radar targets in proximity to the equipped automobile 12. In embodiments where it is desired to effectively sweep the receiving field of view of the phased antenna array module 65, the amplified output of the receiver 70 may be directed back through a second phase delay 68B. Thereafter the return signals are mixed together at a coherent detector 72 which, in conjunction with an output signal from the oscillator 63, provides a signal back to the microprocessor 60 indicative of the location of a radar target, such as an approaching automobile. The microprocessor 60 may further receive a signal from a vehicle speed sensor 74 indicative of the ground speed of the vehicle equipped with the present invention. This vehicle speed sensor 74 may be a doppler based radar oriented toward the ground. The use of a ground oriented radar to monitor the ground speed of the equipped vehicle 12 provides a substantially more accurate measurement. Erroneous ground speed values, for example resulting from changes in tire size, may thus be avoided. Doppler based radars are well known in the relevant arts and need not be discussed herein at length. As noted above, the microprocessor 60 further performs the calculations necessary to determine if an unsafe driving condition exists or is probable. If an unsafe condition is found, suitable activation signals are provided by the microprocessor 60 to the warning devices 76.

Figure 6:
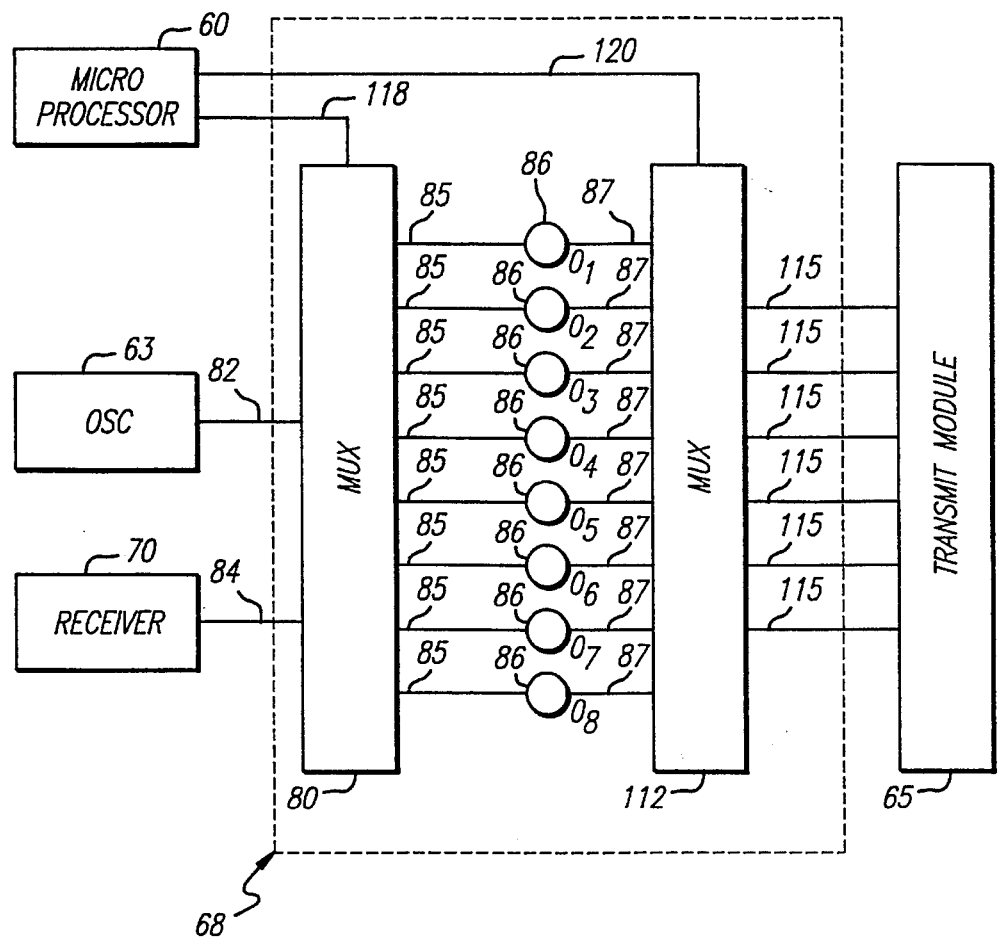
FIG. 6 is a functional block diagram of a selectable phase delay in relation to other elements of the present invention.

The various elements of the radar circuitry including the oscillator 63, coherent detector 72, transmit module 67 and receiver 70 may be derived from conventional millimeter-wave radar devices such as, for example, monolithic millimeterwave integrated circuits. The phase delays 68A and 68B may also be derived from conventional and monolithic millimeterwave integrated circuitry. Referring to FIG. 6, however, there is shown one embodiment of a phase delay device 68 suitable for use in connection with the present invention. As illustrated, the phase delay 68 includes a first multiplexer 80 having an input 82 which is coupled to the oscillator 63, in the case of the first phase delay device 68A or coupled to the coherent detector 72, in the case of the second phase delay device 68B. The first multiplexer 80 is also provided with a plurality of output lines 85 respectively coupled to a number of discrete and independent phase delay elements 86. In one preferred embodiment employing five separate dipole antenna elements in the phased array, eight separate output lines 85 are provided from the multiplexer 80. Each output line 85 is coupled to a separate and distinct delay element 86 for providing a differing phase delay to signals received from the multiplexer 80. Delay elements 86 suitable for imparting a phase delay to an RF signal are known in the relevant arts and need not be discussed in detail. The delay elements 86 are in turn provided with output lines 87 coupled to the input of a second multiplexer 112. This second multiplexer 112 includes a plurality of output lines 115 respectively coupled to inputs associated with the individual inputs of the transmit module 65, in the case of the first delay device 68A or coupled to outputs of the receiver 70 in the case of the second phase delay device 68B. The first multiplexer 80 and second multiplexer 112 respectively receive command signals from the microprocessor 60 through command lines 118 and 120. The microprocessor 60 is thus able to selectively introduce any one of the various phase delays into radar frequency signals from the oscillator 63 and direct the phase delayed signal to any one of the individual antenna elements 50 within the antenna module 65 so as to provide a narrow radar beam that may be scanned across the effective field of view of the entire antenna module 65. Similarly, in the case of the second phase delay device 68B the processor 60 can selectively introduce a phase delay into any one of the amplified return signals from any one of the antenna elements 50 so as to effect a narrow view scan of return signals across the effective field of view of the antenna module 65.

Figure 7:
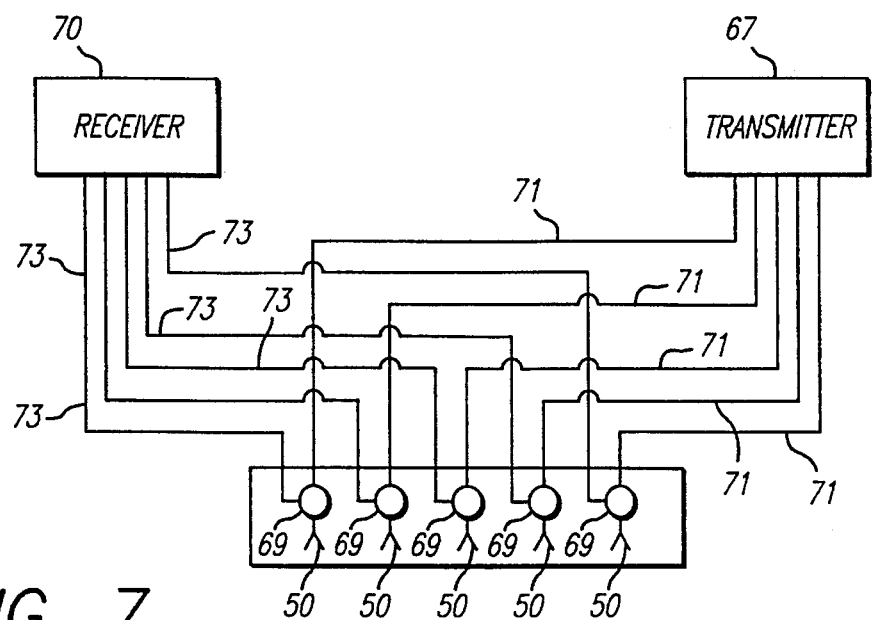
FIG. 7 is a functional block diagram of the transmit, receive and antenna modules of the phased array radar of the present invention.

Referring to FIG. 7 there is shown one exemplary embodiment of the antenna module 65. As shown, the antenna module 65 includes a plurality of separate individual dipole antenna elements 50. As discussed above, in one preferred embodiment of the invention five separate dipole antenna elements 50 are employed to provide a phased array radar antenna system having a field of view of approximately 120° for the entire array and a sweep angle resolution of about 10°. Coupled to each individual dipole antenna element 50 is a conventional signal circulator 69. Each circulator 69 has an independent input line 71 coupled to the transmit module 67 and an independent output line 73 coupled to the receiver module 70. As is known in the relevant art, circulators provide a signal path such that an input signal transmitted through the circulator input line 71 is transmitted to the dipole antenna element 50, while a return signal propagating from the dipole antenna element 50 is directed through the circulator 69 to the output line 73 rather than the input line 71. In addition to being known in the relevant arts, circulators are available from a variety of vendors, such as Microline Inc.

It should be understood that the present invention is not limited to the illustrative radar circuit structure disclosed above. Other arrangements of the phased array antenna system could be employed without departing from the scope of the present invention. The circuitry disclosed above provides a narrow beam that is scanned across the effective field of view of the entire antenna array. The field of view of signals received from the antenna array similarly has a narrow field of view that is effectively scanned across the entire field of view of the antenna array. This approach provides for an optimum resolution of targets within the effective field of view of the antenna array, while minimizing false alarms. Alternatively, however, the radar array could be operated in either a wideband transmit or wide band receive mode. In the case of a wideband transmit mode, the phase delay 68A coupled to the transmit module 67 would be omitted. In this case the output from the antenna array 65 would be continuously broadcast across a wide band, rather than having a narrow beam that is swept across an effective field of view. In such applications, the transmit module may be advantageously coupled to only a pair of the antenna elements, so as to minimize energy consumption. Alternatively, in a wideband receive mode, the phase delay 68B disposed between the receive module 70 and coherent detector 72 would be eliminated. In this embodiment, the receiving field of view of the antenna array would span the entire effective field of view of the array, rather than having a narrow beam that is progressively swept across the effective field of view.

Figure 8:
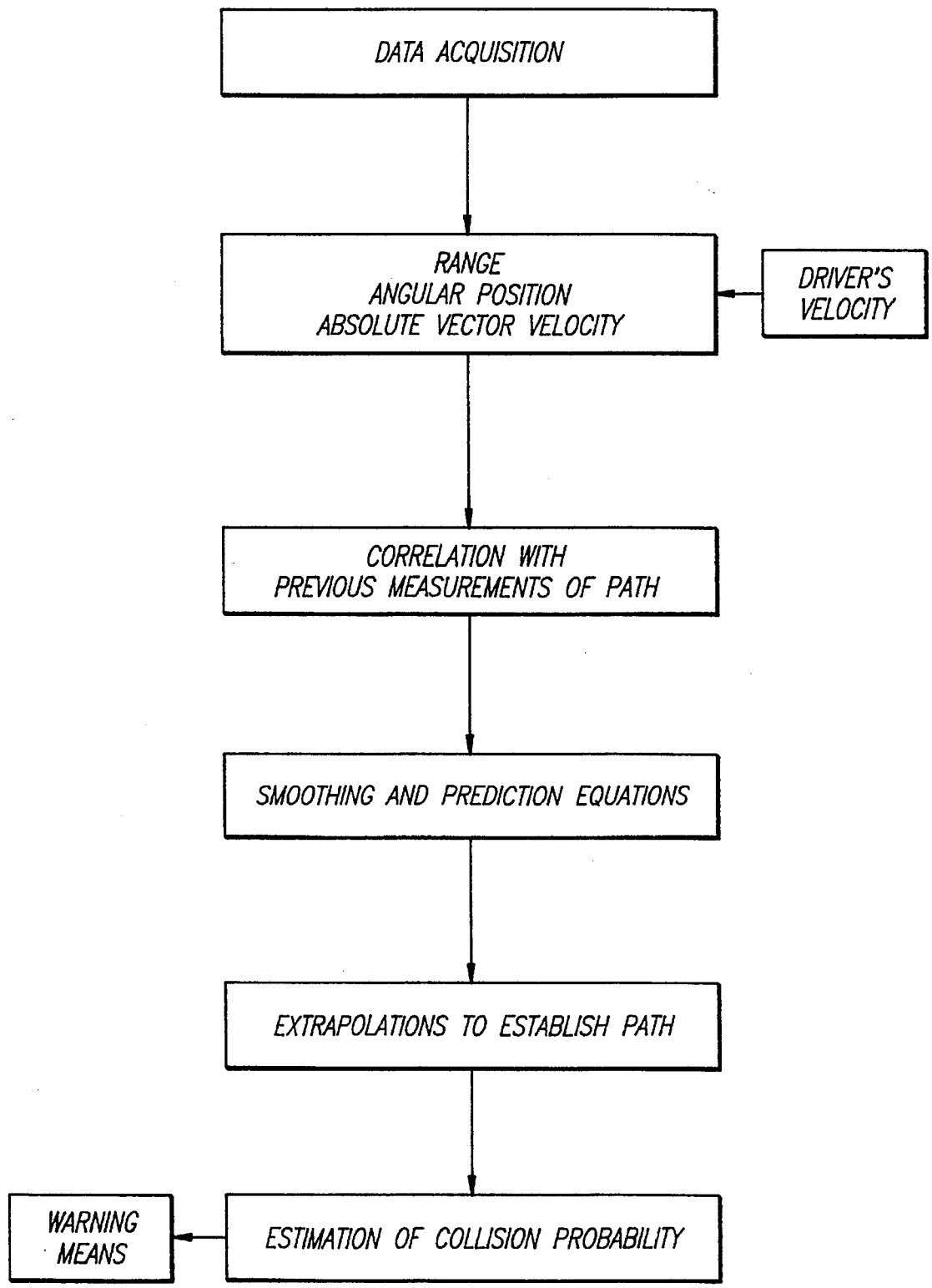
FIG. 8 is a block diagram of the functional operation of the present invention.

Referring to FIG. 8 there is shown a schematic block diagram of the methodology implemented by the microprocessor 60 to determine the presence of an unsafe condition or predict an imminent unsafe condition. Repetitive signals received by the microprocessor 60 from the coherent detector 72 provide for a determination of the relative range, angular position velocity and acceleration of a radar target. Additionally, receipt of the ground speed of a vehicle equipped with the present invention provides a determination of the absolute velocity and acceleration vectors for the radar target. Repetitive determination and storage of time dependent position, velocity and acceleration vectors for the radar target permits determination of a time dependent path or trajectory for the radar target that need not be linear. A simplified version of Kalman filtering techniques, known in the mathematical arts, may also be applied to extrapolate a predicted path from the previously measured path of the radar target and permit estimation of the probability of a collision or other unsafe driving condition. This filtering can also be used to track changes in acceleration. The target trajectory estimation may be performed by implementing the equation:

$$\bar{r}=(\bar{r}_d-\bar{r}_o)+(\bar{v}_d-\bar{v}_o)t+ \frac{1}{2}(\bar{a}_d-\bar{a}_o)t^2$$

Where $\bar{r}$=the vectorial distance between the equipped vehicle and a radar target, $\bar{v}$ is the time dependent respective velocities and $\bar{a}$ is the time dependent accelerations, respectively, of the equipped car d; and the radar target o.

When the distance between the equipped vehicle and a radar target is predicted to equal a predetermined minimum, within a predetermined time frame, an unsafe driving condition may be identified. The microprocessor 60 then provides an activation signal to the warning devices 76. As noted above, a warning is provided to the driver of both the equipped automobile and the drivers of the other vehicles involved in the unsafe conditions. In the case of a vehicle following too closely behind the equipped vehicle, for example, this warning would warn the following driver to slow down or otherwise increase the spacing between the vehicles.

The present invention provides a significantly enhanced vehicular collision avoidance system and safety warning system by implementing a phased array based radar device having components which may be derived from conventional monolithic millimeterwave integrated circuits. The warning system provides a warning not only to the driver of the equipped automobile, but to the drivers of other involved vehicles as well. Thus the system is far more effective in avoiding accidents and better suited to immediate use in a vehicular environment where only a minority of vehicles may be similarly equipped. Many alterations and modifications may be made to the present invention by those having ordinary skill in the art without departing from the spirit and scope of the invention. Thus for example, the interconnections between the oscillator and transmit module (including the phase delays) could be implemented using optical couplings. Therefore, it must be understood that the illustrated embodiments have been set forth for the purposes of example and that it should be not taken as limiting the invention defined by the following claims. The following claims are, therefore, to be read to include not only the combination of elements that are literally set forth, but all equivalent elements for performing substantially the same function in substantially the same way to obtain substantially the same result. The claims are thus to be understood to include what is specifically illustrated and described above, and what is conceptually equivalent.

I claim:

1. A vehicular collision avoidance system, comprising:

a first scanning phased array radar system mounted on a vehicle;

a microprocessor configured to control operation of the phased array radar and determine when a radar target creates an unsafe driving condition by repeatedly tracking a target and calculating a minimum probable position of the target relative to the vehicle based on an extrapolation of a recorded path for the target; and means for warning a driver of the vehicle when an unsafe driving condition occurs, wherein said vehicular collision avoidance system provides a warning to the vehicle driver when unsafe driving conditions result from an automobile approaching the vehicle.

2. The vehicular collision avoidance system of claim 1 further comprising means for signalling to an approaching automobile when an unsafe driving condition is present.

3. The vehicular collision avoidance system of claim 2 wherein said signalling means includes means, responsive to input from said microprocessor, for activating headlights of the vehicle.

4. The vehicular collision avoidance system of claim 1 wherein said microprocessor extrapolates from a recorded path for the target by measuring successive positions of the target, calculating a current velocity of the target, and correlating with successive target positions to estimate a probable path of the target relative to the vehicle.

5. The vehicular collision avoidance system of claim 1 wherein said phased array radar includes:

an oscillator;

a selective phase delay having an input coupled to the oscillator and a delayed output responsive to control signals from said microprocessor;

an array of antenna elements responsive to signals from said phase delay;

a plurality of amplifiers respectively having outputs providing amplified radar signals to said antennas and inputs coupled to said phase delay;

a plurality of multiplexers respectively coupled to said antennas and providing alternative signal paths from said antennas to associated antenna amplifiers and to said phase delay; and a receiver coupled to said oscillator configured to mix return signals received from said antenna with an output from said oscillator for providing a signal indicative of a radar target presence, wherein the fixed antenna elements cooperate with one another to selectively scan a radar beam across a range of angles.

6. The vehicular collision avoidance system of claim 5 further comprising a plurality of amplifiers respectively having outputs providing amplified radar signals to said antennas and inputs coupled to said phase delay.

7. The vehicular collision avoidance system of claim 5 further comprising a plurality of multiplexers respectively coupled to said antennas and providing alternative signal paths from said antennas to associated antenna amplifiers and to said phase delay.

8. The vehicular collision avoidance system of claim 5 wherein said antennas are formed in a strip array having at least five full-dipole configurations respectively spaced apart a distance generally equal to one-half of the wavelength of radiation emanating from the antennas.

9. The vehicular collision avoidance system of claim 5 wherein said antennas are formed in a flexible strip array conforming to a curvature of a surface of the vehicle.

10. The vehicular collision avoidance system of claim 5 wherein said phase delay includes:

all input multiplexer coupled to said oscillator and responsive to signals from said microprocessor;

a plurality of separate signal paths having different propagation intervals; and an output multiplexer coupled to said separate conductive paths and also responsive to signals from said microprocessor.

11. The vehicular collision avoidance system of claim 1 further comprising a first array of phased array antenna elements oriented from one side of the vehicle and a second array of phased array antenna elements oriented from an opposing side of the vehicle, wherein said vehicular collision avoidance system provides a warning when unsafe driving conditions result from an automobile approaching a side of the equipped vehicle.

12. The vehicular collision avoidance system of claim 11 further comprising a third array of phased array radar antenna elements oriented from a rear of the vehicle, wherein automobiles following the vehicle may be monitored for unsafe driving conditions.

13. The vehicular collision avoidance system of claim 11 further comprising a third array of phased array radar antenna elements oriented from the forward end of the vehicle, wherein automobiles and obstacles in front of the vehicle may be monitored for unsafe driving conditions.

14. A vehicular collision avoidance system, comprising:

a first scanning phased array radar mounted on one side of a vehicle and having a 180° field of view;

a second scanning phased array radar oriented towards an opposing side of the vehicle and also having a generally 180° field of view;

a microprocessor configured to control operations of the phased array radar and determine when a radar target creates an unsafe driving condition by measuring successive positions of the target, calculating a current velocity of the target, and correlating with successive target positions to estimate a probable path of the target relative to the vehicle; and means for warning a driver of the vehicle of an unsafe driving condition, wherein said vehicular collision avoidance system provides a warning to the vehicle driver when an unsafe driving condition results from an obstacle or automobile in front of the vehicle, an automobile approaching from the side of a vehicle, and an automobile following too closely behind the vehicle.

15. The vehicular collision avoidance system of claim 14 further comprising means for signalling to an approaching automobile when an unsafe driving condition is present.

16. The vehicular collision avoidance system of claim 15 wherein said signalling means includes means, responsive to input from said microprocessor, for activating headlights of the vehicle.

17. The vehicular collision avoidance system of claim 14 wherein said phased array radar includes:

an oscillator;

a selective phase delay having an input multiplexer coupled to said oscillator and responsive to signals from said microprocessor, a plurality of separate signal paths having different propagation intervals, and an output multiplexer coupled to said separate signal paths and also responsive to signals from said microprocessor;

an array of antenna elements responsive to signals from said phase delay; and a receiver coupled to said oscillator configured to mix return signals received from said antenna with an output from said oscillator for providing a signal indicative of a radar target presence, wherein the fixed antenna elements cooperate with one another to selectively scan a radar beam across a range of angles.

18. The vehicular collision avoidance system of claim 17 further comprising a plurality of amplifiers respectively having outputs providing amplified radar signals to said antennas and inputs coupled to said phase delay.

19. The vehicular collision avoidance system of claim 17 further comprising a plurality of circulators respectively coupled to said antennas and providing alternative signal paths to said antennas from associated antenna amplifiers and to said receiver.

20. The vehicular collision avoidance system of claim 17 wherein said antennas are formed in a flexible strip array conforming to a curvature of a surface of the vehicle.

21. A vehicular collision avoidance system, comprising:

a first scanning phased array radar oriented towards a rear of an equipped vehicle;

a microprocessor configured to control operation of the phased array radar and determine when a target automobile creates an unsafe driving condition by measuring successive positions of the target, calculating a velocity of the target, and correlating with successive target positions to estimate a probable path of the target relative to the vehicle; and means for warning a driver of the target automobile of an unsafe driving condition, wherein said vehicle collision avoidance system provides a warning to the target automobile driver when an unsafe driving condition results from following the vehicle too closely.

22. The vehicular collision avoidance system of claim 21 further comprising means for signalling to an approaching automobile when an unsafe driving condition is present.

23. The vehicular collision avoidance system of claim 22 wherein said signalling means includes means, responsive to input from said microprocessor, for activating headlights of the vehicle.

24. The vehicular collision avoidance system of claim 21 further comprising a second phased array radar oriented towards a side of the vehicle and responsive to said microprocessor, wherein said vehicle collision avoidance system provides a warning to a driver of the vehicle that an unsafe driving condition results from an automobile approaching the vehicle from a side of the vehicle.

25. The vehicular collision avoidance system of claim 21 wherein said microprocessor determines when the target creates an unsafe driving condition by repeatedly calculating the position and velocity of the target relative to the vehicle.

26. The vehicular collision avoidance system of claim 21 wherein said microprocessor determines when the target target creates an unsafe driving condition by repeatedly calculating a minimum position of the target relative to the vehicle based on an extrapolation of recorded path for the target.

27. The vehicular collision avoidance system of claim 26 wherein said microprocessor extrapolates from a recorded path for the target by measuring successive positions of the target, calculating a current velocity of the target, and correlating with successive target positions to estimate a probable path of the target relative to the vehicle.

28. The vehicular collision avoidance system of claim 21 wherein said phased array radar includes:

an oscillator;

a selective phase delay having an input multiplexer coupled to said oscillator and responsive to signals from said microprocessor, a plurality of separate signal paths having different propagation intervals, and an output multiplexer coupled to said separate signal paths and also responsive to signals from said microprocessor;

an array of antenna elements responsive to signals from said phase delay; and a receiver coupled to said oscillator configured to mix return signals received from said antenna with an output from said oscillator for providing a signal indicative of a radar target presence, wherein the fixed antenna elements cooperate with one another to selectively scan a radar beam across a range of angles.

29. The vehicular collision avoidance system of claim 28 further comprising a plurality of amplifiers respectively having outputs providing amplified radar signals to said antennas and inputs coupled to said phase delay.

30. The vehicular collision avoidance system of claim 28 further comprising a plurality of multiplexers respectively coupled to said antennas and providing alternative signal paths from said antennas to associated antenna amplifiers and to said phase delay.

31. The vehicular collision avoidance system of claim 28 wherein said antennas are formed in a flexible strip array conforming to a curvature of a surface of the vehicle.

32. The vehicular collision avoidance system of claim 24 further comprising a third phased array radar oriented towards the forward end of the vehicle, wherein automobiles and obstacles in front of the vehicle may be monitored for unsafe driving conditions.

* * * * *